Figure 1:
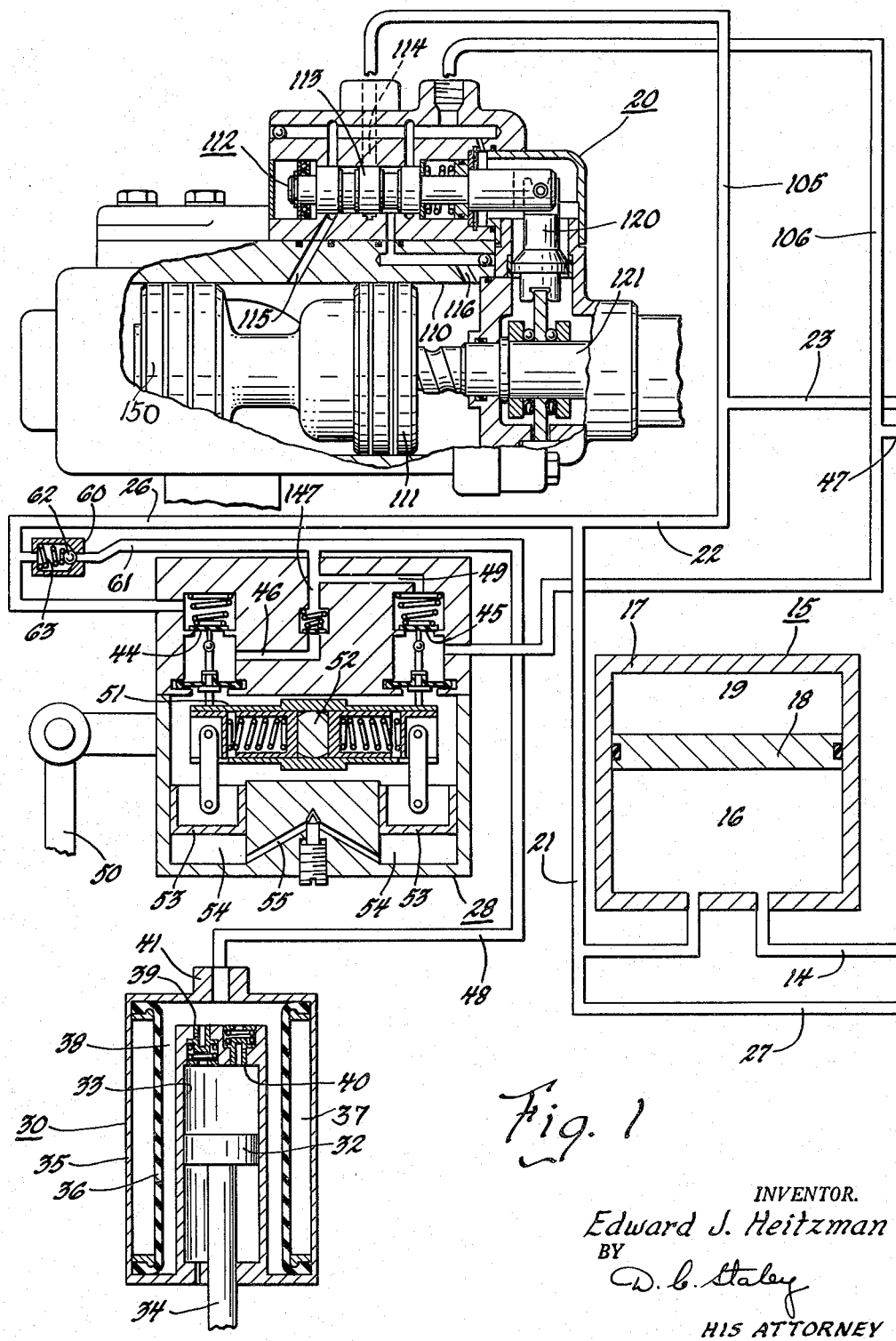

INVENTOR.
Edward J. Heitzman
BY
D. C. Staley
HIS ATTORNEY

Aug. 8, 1961     E. J. HEITZMAN     2,995,382
RESERVE HYDRAULIC FLUID SYSTEM
Filed May 19, 1960     2 Sheets-Sheet 2

INVENTOR.
Edward J. Heitzman
BY
HIS ATTORNEY

United States Patent Office 2,995,382
Patented Aug. 8, 1961

2,995,382
RESERVE HYDRAULIC FLUID SYSTEM
Edward J. Heitzman, Utica, Mich., assignor to General Motors Corporation, Detroit, Mich., a corporation of Delaware
Filed May 19, 1960, Ser. No. 30,202
7 Claims. (Cl. 280—124)

This invention relates to a hydraulic operating system adapted for use on a vehicle that has a sprung mass resiliently supported on an unsprung mass by means of a resiliently acting hydropneumatic or air-oil spring.

The use of hydropneumatic or air-oil springs to resiliently support a sprung mass upon an unsprung mass of a vehicle is well-known in the art of suspension of vehicles. These resiliently acting air-oil springs usually consist of a body of liquid in a container that works against a body of gas in the container so that movement of the liquid against the body of gas provides for resilient suspension of a sprung mass on an unsprung mass of the vehicle.

It is also now well-known in the art that other hydraulically operated components are incorporated on a vehicle to actuate various mechanisms of the vehicle such as the brakes and the steering mechanism. These hydraulically operated components receive hydraulic fluid under pressure from a suitable source of pressure on the vehicle to actuate the brakes or the steering mechanism in response to manual actuation of the operator of the vehicle.

The source of hydraulic fluid pressure on the vehicle for operation of the hydraulically actuated components may be in the form of a suitable liquid pump supplying hydraulic fluid under pressure to an accumulator by which the fluid under pressure in the supply portion of the hydraulically operated system is maintained at a relatively constant value, the hydraulic pump maintaining the hydraulic pressure in the accumulator at a predetermined pressure level.

However, if the hydraulic pump should fail for any reason and the pressure in the accumulator fall considerably below the desired level required to operate the hydraulically operated components, the operator of the vehicle is in difficulty because of insufficient supply of hydraulic fluid to the hydraulically operated components to maintain their normal operation.

In a hydraulic operating system for a vehicle that is provided with hydropneumatic or air-oil spring means, the oil in the springs can be used as an emergency supply for source of oil for supply to the power steering or the power brakes to maintain their normal operation for a short period of time. This of course will be at the expense of a lowering of the chassis of the vehicle relative to the running gear for the same, but in an emergency condition this lowering of the chassis of the vehicle relative to the running gear is not so serious as failure of the power brake system or the power steering system for the vehicle. Also this lowering of the chassis of the vehicle relative to the running gear will warn the operator of the vehicle that a failure has occurred in the hydraulic system that is being maintained under an emergency condition by the flow of hydraulic fluid from the hydropneumatic or air-oil springs of the vehicle. Thus, even though the normal hydraulic system of the vehicle should fail, the operator will be given sufficient warning that the system can be corrected before total failure of the brake or power steering system, or any other hydraulically operated component on the vehicle that needs to be maintained in operation under all emergency conditions.

It is therefore an object of this invention to provide a hydraulic operating system for a vehicle in which the oil or liquid supply in the hydropneumatic or air-oil springs for the vehicle can be used as an emergency supply of hydraulic fluid in the event of failure of the hydraulic system on the vehicle.

It is still another object of the invention to provide a hydraulic operating system in accordance with the foregoing object wherein the supply of oil or liquid from the air-oil springs of the vehicle will be supplied automatically to the other hydraulically operated components of the vehicle in the event of failure of the primary hydraulic system, a suitable valve being provided in the supply line for the air-oil springs that is normally maintained closed to prevent fluid connection between the air-oil springs and the primary hydraulic system by way of the valve, this valve being openable in the event the hydraulic pressure in the primary system falls below a predetermined value, specifically below the value of the hydraulic pressure in the air-oil springs so that the flow of oil can take place from the air-oil springs into the supply conduit system for the primary hydraulic system at any time the hydraulic pressure in the supply conduits for the primary system falls below the pressure in the air-oil or hydropneumatic springs for the vehicle.

Further objects and advantages of the present invention will be apparent from the following description, reference being had to the accompanying drawings wherein a preferred embodiment of the present invention is clearly shown.

Figure 2:
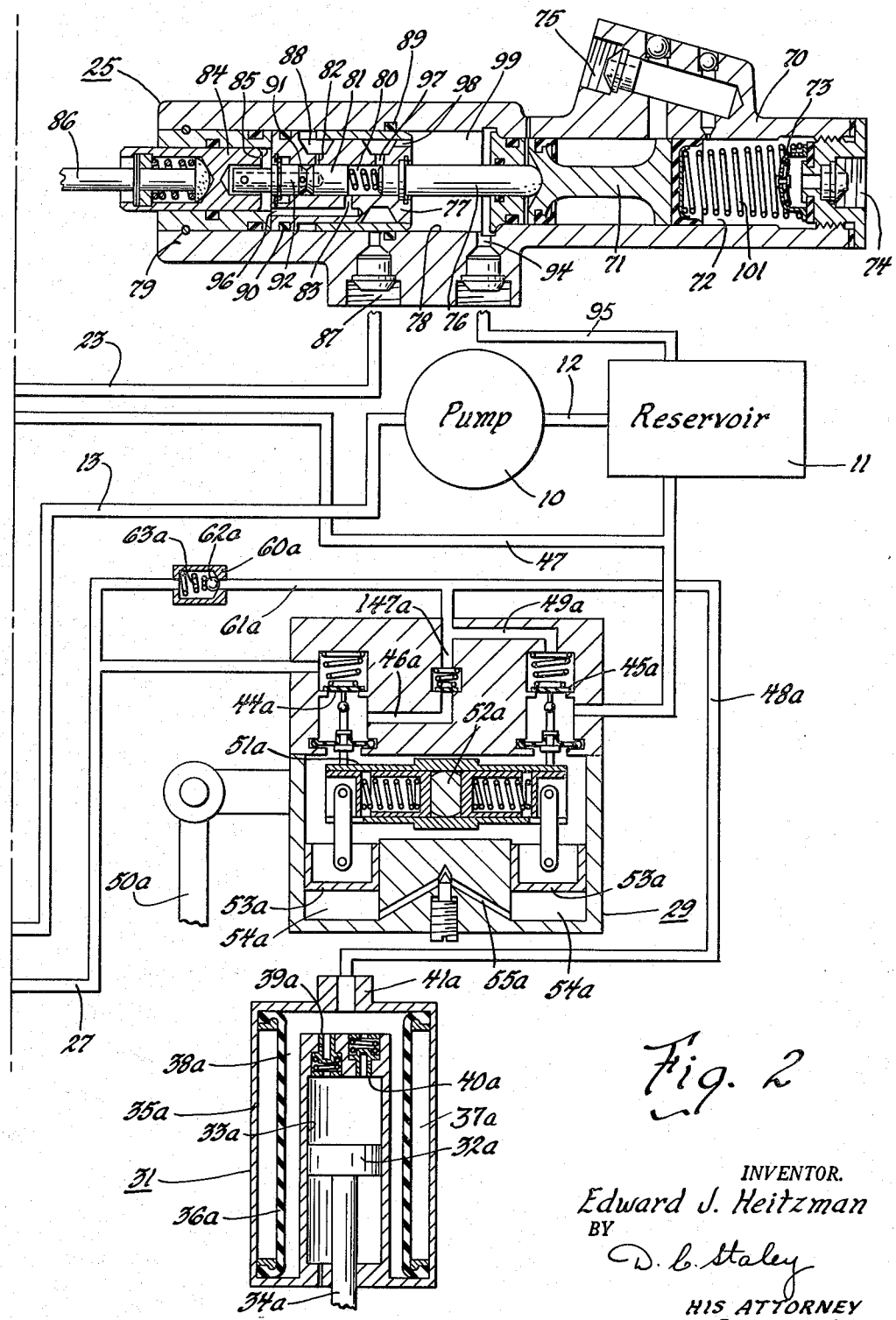

In the drawings:

in FIG. 1 with other components of the system illustrated certain components of the system in cross section incorporating features of the invention, FIGS. 1 and 2 being read together with FIG. 2 placed on the right-hand side of FIG. 1.

FIG. 2 is a part of the schematic system illustrated in FIG. 1 with other components of the system illustrated in cross section and shall be read together with FIG. 1.

In the drawings, using FIGS. 1 and 2 together with FIG. 2 placed on the right-hand side of FIG. 1, there is illustrated schematically a hydraulic operating system for the vehicle wherein a primary hydraulic system provides hydraulic fluid under pressure to a power operated brake actuating device and to a power operated steering gear mechanism, the hydraulic system also supplying fluid under pressure to an air-oil spring for the vehicle under control of height regulating valves to maintain clearance height between the sprung mass and the unsprung mass of the vehicle relatively constant.

The hydraulic operating system of this invention includes a fluid pressure pump or hydraulic pump 10 that receives hydraulic fluid from a reservoir 11 through the line 12 and delivers hydraulic fluid under pressure into the supply line 13. The pump 10 may be driven by any suitable source of power on the vehicle. The supply line 13 delivers hydraulic fluid under pressure to a pressure accumulator 15 through the line 14 to retain a body of hydraulic fluid 16 in the accumulator 15.

The accumulator 15 consists of a container 17 having a piston 18 therein that separates the body of hydraulic fluid 16 from an air chamber 19 so that when hydraulic fluid under pressure is delivered into the accumulator, the air in the chamber 19 is placed under pressure so that re-expansion of the air in the chamber 19 will tend to drive the hydraulic fluid from the accumulator and will maintain the pressure of the hydraulic fluid in the primary supply lines for the hydraulic operating system at a relatively uniform pressure.

Hydraulic fluid under pressure is supplied to a hydraulically operated power steering unit 20 through the supply conduits 21 and 22. Hydraulic fluid under pressure hand direction, port 82 will be opened and port 83 will be closed to allow fluid under pressure to be supplied to the left-hand end of the power piston and thereby drive it forward in a right-hand direction to move the master cylinder piston 71 and drive fluid from cylinder 72 into the brake system.

On release of the brake pedal, the valve member 81 will move in a left-hand direction to close port 82 and open port 83 whereby the fluid under pressure on the left-hand end of the piston 77 will then be allowed to be exhausted back to the reservoir 11 and the return spring 101 in the master cylinder will return the master cylinder piston to the position shown in the drawing.

The primary hydraulic system is also adapted to operate a power steering mechanism, hydraulic fluid under pressure being supplied to the power steering mechanism through the conduit 105 and exhausted and returned to the reservoir through the conduit 106.

The hydraulically operated power steering mechanism 20 consists of a power cylinder 110 in which a power piston 111 reciprocates. The power piston 111 is connected with the pinion and worm gear of the steering mechanism to power actuate the same.

Hydraulic fluid under pressure is supplied to opposite sides of the power piston 111 under control of the closed center power steering valve 112 that has the gland portion 113 normally closing the high-pressure hydraulic fluid inlet port 114. When the gland portion 113 of the valve 112 is moved either to the left or to the right, hydraulic fluid under pressure can be supplied to opposite sides of the power piston 111 through the passages 115 and 116 respectively, depending upon the direction of movement of the gland 113 relative to the inlet port 114, the chambers at opposite sides of member 150 being in fluid communication. This valve 112 is controlled by the operating mechanism 120 that is connected with the worm 121 of the steering mechanism that shifts axially in response to the direction of rotation of the steering shaft.

From the foregoing description, it will be apparent that so long as the hydraulic pressure in the primary hydraulic system is maintained above the maximum pressure required in the air-oil or hydropneumatic springs 30 and 31, the hydraulic system will function normally with all of the several hydraulically operated devices receiving hydraulic fluid under pressure for their operation from the pump 10 and the accumulator 15.

However, should the pump fail or for any reason hydraulic pressure in the primary system fall below the pressure of the hydraulic fluid in the chamber space 38 of the air springs 30 and 31, check valves 60 and 60a can open in a leftward direction, as viewed in the drawings, to allow hydraulic fluid under pressure to be delivered from the chamber spaces 38 and 38a into the primary hydraulic system for continued operation of the other hydraulically operated components, such as the power operated brake mechanism 25 and the power steering mechanism 20.

What is claimed is as follows:

1. A hydraulic operating system for a vehicle having a sprung mass resiliently supported on an unsprung mass, including in combination, air-oil spring means for supporting resiliently a sprung mass on an unsprung mass, other hydraulically operated component means for the vehicle, a source of hydraulic pressure fluid, conduit means providing fluid flow connection of said source with said air-oil spring means and said other component means and including valved conduit means closed so long as hydraulic pressure in said source is greater than that in said air-oil spring means and providing fluid connection of said fluid spring means with said other component means as an auxiliary source of fluid supply thereto whenever hydraulic pressure in said source is less than the hydraulic pressure in said air-oil spring means.

2. A hydraulic operating system for a vehicle having a sprung mass resiliently supported on an unsprung mass, including in combination, air-oil spring means for supporting resiliently a sprung mass on an unsprung mass, other hydraulically operated component means for the vehicle, a source of hydraulic pressure fluid, conduit means providing fluid flow connection of said source with said air-oil spring means and said other component means and providing fluid connection between said air-oil spring means and said other component means, and uni-directional flow control valve means in the conduit connection of said air-oil spring means with said source and with said other component means normally closed against fluid flow from the air-oil spring means so long as hydraulic pressure in said source is above the hydraulic pressure in said air-oil spring means and openable for supply of hydraulic fluid from said air-oil spring means as an auxiliary fluid supply to said other component for operation thereof whenever hydraulic pressure in said source is less than the hydraulic pressure in said air-oil spring means.

3. A hydraulic operating system for a vehicle having a sprung mass resiliently supported on an unsprung mass, including in combination, resiliently acting spring means comprising a body of liquid working against a body of gas for supporting thereby resiliently a sprung mass on an unsprung mass, other liquid operated component means for the vehicle, a source of liquid pressure fluid, supply conduit means providing for liquid flow connection of said source with the body of liquid in said spring means and said other component means providing for fluid supply from said source thereto, and conduit means connecting the body of liquid in said spring means with said supply conduit means including valve means therein closed so long as hydraulic pressure in said source is greater than that in said spring means and providing liquid connection from said body of liquid in said air spring with said other component means as an auxiliary source of fluid supply thereto whenever hydraulic pressure in said source is less than the hydraulic pressure in said spring means.

4. A hydraulic operating system for a vehicle having a sprung mass resiliently supported on an unsprung mass, including in combination, resiliently acting spring means comprising a body of liquid working against a body of gas supporting thereby resiliently a sprung mass on an unsprung mass, other liquid operated component means for the vehicle, a source of liquid pressure fluid, supply conduit means providing liquid flow connection of said source with the body of liquid in said spring means and with said other component means, and valved conduit means fluid connecting said body of liquid in said spring means with said supply conduit means providing thereby for liquid flow from said body of liquid in said spring means to said other component means whenever hydraulic pressure in said supply conduit means is less than the hydraulic pressure in said spring means.

5. A hydraulic operating system for a vehicle having a sprung mass resiliently supported on an unsprung mass, including in combination, resiliently acting spring means comprising a body of liquid working against a body of gas supporting thereby resiliently a sprung mass on an unsprung mass, other liquid operated component means for the vehicle, a source of liquid pressure fluid, supply conduit means providing liquid flow connection of said source with the body of liquid in said spring means and with said other component means, and conduit means fluid connecting the body of liquid of said spring means with said supply conduit means for liquid flow from said body of liquid of the spring means into said supply conduit means and including valve means therein held closed by said source pressure so long as the source pressure is above the pressure in the said spring means and is openable for supply of liquid from said body of liquid in the spring means to the other component when the said source pressure falls below the fluid pressure in the said spring means.

6. A hydraulic operating system for a vehicle having a sprung mass resiliently supported on an unsprung mass, including in combination, resiliently acting spring means comprising a body of liquid working against a body of gas for supporting resiliently a sprung mass on an unsprung mass, other liquid operated component means for the vehicle, a source of liquid pressure in fluid connection through supply conduit means with said spring means and with said other component, height regulating valve means actuated by change in clearance height between the sprung mass and the unsprung mass of a vehicle controlling supply of liquid from said supply conduit means to said spring and exhaust of liquid from the spring to maintain thereby said clearance height relatively constant, a conduit means connecting between said spring and said supply conduit means bypassing said height regulating valve means for supply of liquid from said spring to said supply conduit means to maintain operation of said other component by liquid supplied from said spring, said last mentioned conduit means including normally closed valve means therein to close off said connection between said spring and said supply conduit means except when said liquid pressure in said supply conduit means is less than the pressure in said spring.

7. A hydraulic operating system for a vehicle having a sprung mass resiliently supported on an unsprung mass, including in combination, resiliently acting spring means comprising a body of liquid working against a body of gas for supporting resiliently a sprung mass on an unsprung mass, other liquid operated component means for the vehicle, a source of liquid pressure in fluid connection through supply conduit means with said spring means actuated by change in clearance height between the sprung mass and the unsprung mass of a vehicle controlling supply of liquid from said supply conduit means to said spring and exhaust of liquid from the spring to maintain thereby said clearance height relatively constant, a conduit means connecting between said spring and said supply conduit means bypassing said height regulating valve means for supply of liquid from said spring to said supply conduit means to maintain operation of said other component by liquid supplied from said spring, said last mentioned conduit means including valve means therein held closed by liquid pressure in said supply conduit means above the pressure in said spring normally to close off said connection between said spring and said supply conduit means and openable when liquid pressure in said supply conduit means is less than the pressure in said spring for supply of liquid from said spring to the said other component to maintain operation thereof.

References Cited in the file of this patent

UNITED STATES PATENTS 2,827,123     Lincoln _____ Mar. 18, 1958